US010174213B2

(12) United States Patent
Kruesemann et al.

(10) Patent No.: US 10,174,213 B2
(45) Date of Patent: Jan. 8, 2019

(54) COATING SYSTEM

(75) Inventors: Juliane Kruesemann, Ludwigshafen (DE); Thomas Frey, Schwetzingen (DE); Rainer Henning, Freinsheim (DE); Annegret Pietsch, Heddesheim (DE); Claudia Sierakowski, Seeheim-Jugenheim (DE); Tom Landuydt, Breitenbach (CH)

(73) Assignee: BASF SE, Ludwigshafen (DE)

( * ) Notice: Subject to any disclaimer, the term of this patent is extended or adjusted under 35 U.S.C. 154(b) by 720 days.

(21) Appl. No.: 14/344,775

(22) PCT Filed: Sep. 14, 2012

(86) PCT No.: PCT/EP2012/068025
§ 371 (c)(1),
(2), (4) Date: Mar. 13, 2014

(87) PCT Pub. No.: WO2013/037928
PCT Pub. Date: Mar. 21, 2013

(65) Prior Publication Data
US 2015/0004424 A1 Jan. 1, 2015

Related U.S. Application Data

(60) Provisional application No. 61/535,378, filed on Sep. 16, 2011.

(30) Foreign Application Priority Data

Sep. 16, 2011 (EP) .................................... 11181548

(51) Int. Cl.
C09D 7/00 (2018.01)
C09D 101/14 (2006.01)
C09D 123/06 (2006.01)
C09D 5/33 (2006.01)
C09D 5/02 (2006.01)
C09D 5/00 (2006.01)
C09D 7/41 (2018.01)
C09D 7/61 (2018.01)

(52) U.S. Cl.
CPC ............... C09D 7/007 (2013.01); C09D 5/00 (2013.01); C09D 5/004 (2013.01); C09D 5/028 (2013.01); C09D 7/41 (2018.01); C09D 7/61 (2018.01); C09D 101/14 (2013.01); C09D 123/06 (2013.01); *Y10T 428/31938* (2015.04)

(58) Field of Classification Search
CPC ........ B05D 7/54; C08K 3/013; C08K 5/0041; C08K 3/0033; C09D 17/003; C09D 5/004; C09D 7/45; C09D 7/63; C09D 7/67; C09D 7/70; C09D 7/02; C09D 7/1233; C09D 7/1266; C09D 7/129
See application file for complete search history.

(56) References Cited

U.S. PATENT DOCUMENTS

| 4,598,020 A * | 7/1986 | Panush ................. C08K 9/02 427/407.1 |
| 5,871,827 A | 2/1999 | Jaffe et al. |
| 2003/0185993 A1 | 10/2003 | Kamimori et al. |
| 2004/0194663 A1 | 10/2004 | Li et al. |
| 2004/0220322 A1 | 11/2004 | Gooding et al. |
| 2005/0228112 A1 | 10/2005 | Takahashi et al. |
| 2006/0010620 A1 * | 1/2006 | Krabbe ................. D01F 1/04 8/638 |
| 2007/0051275 A1 | 3/2007 | Muller et al. |
| 2008/0190319 A1 | 8/2008 | Reisacher et al. |
| 2008/0319089 A1 | 12/2008 | Muller et al. |
| 2010/0047620 A1 * | 2/2010 | Decker ................. B05D 7/54 428/688 |
| 2010/0233461 A1 * | 9/2010 | Wood ................. B05D 7/54 428/304.4 |
| 2011/0151163 A1 | 6/2011 | Bloom et al. |
| 2012/0270986 A1 | 10/2012 | Maruyama et al. |

FOREIGN PATENT DOCUMENTS

| CN | 1173522 A | 2/1998 |
| CN | 1681894 A | 10/2005 |
| CN | 101525502 A | 9/2009 |
| CN | 102164997 A | 8/2011 |
| DE | 197 39 262 | 3/1999 |
| DE | 197 39 263 | 3/1999 |

(Continued)

OTHER PUBLICATIONS

Japanese Office Action dated May 30, 2016 in Patent Application No. 2014-530233 (English translation only).
Combined Chinese Office Action and Search Report dated Aug. 24, 2015 in Patent Application No. 201280044928.9 (with English language translation and English translation of categories of cited documents).
International Search Report dated Nov. 20, 2012 in PCT/EP12/068025 Filed Sep. 14, 2012.

(Continued)

*Primary Examiner* — Alexandre F Ferre
(74) *Attorney, Agent, or Firm* — Oblon, McClelland, Maier & Neustadt, L.L.P.

(57) ABSTRACT

A coating formed on a substrate is provided which coating comprises (a) an organic NIR-transparent pigment and/or an inorganic NIR-reflective pigment; (b) a dye having a transmittance of at least 75% in the range of from 700 to 2500 nm; and (c) optionally an effect pigment; wherein said coating exhibits a total solar reflectance (TSR) of (i) ≥40%, if 60<L*<100, or (ii) ≥30%, if 30<L*≤60, or (iii) ≥20%, if 0<L*≤30, wherein L* is the lightness. The coating is suitable for an exterior-use coating like an industrial coating or a coating for vehicles, especially an automotive finish, having improved jetness.

20 Claims, No Drawings

(56) References Cited

FOREIGN PATENT DOCUMENTS

| | | |
|---|---|---|
| DE | 198 34 194 | 2/2000 |
| DE | 103 43 704 | 4/2005 |
| JP | 2004-174469 A | 6/2004 |
| JP | 2005-76019 A | 3/2005 |
| JP | 2005-97462 A | 4/2005 |
| JP | 2006-8874 A | 1/2006 |
| JP | 2011-26543 A | 2/2011 |
| JP | 2011-225652 A | 11/2011 |
| JP | 2012-36331 A | 2/2012 |
| WO | 03 014228 | 2/2003 |
| WO | 03 064540 | 8/2003 |
| WO | 03 066743 | 8/2003 |
| WO | 2004 000903 | 12/2003 |
| WO | 2004 029159 | 4/2004 |
| WO | 2004 033563 | 4/2004 |
| WO | 2004 046251 | 6/2004 |
| WO | 2004 050770 | 6/2004 |
| WO | 2004 074382 | 9/2004 |
| WO | 2005 078023 | 8/2005 |
| WO | 2008 097895 | 8/2008 |
| WO | 2009 018074 | 2/2009 |
| WO | 2011 056564 | 5/2011 |
| WO | WO 2011/058966 A1 | 5/2011 |

OTHER PUBLICATIONS

European Search Report dated Jan. 24, 2012 in European Patent Application No. 11 18 1548.6 Filed Sep. 16, 2011.
Third Party Observation issued Dec. 1, 2015 in Japanese Patent Application No. 2014-530233 (with English language translation).
Japanese Office Action dated Jan. 10, 2017 in Patent Application No. 2014-530233 (English Translation only).

* cited by examiner

COATING SYSTEM

This application is National Stage of PCT/EP2012/068025, which was filed on Sep. 14, 2012. PCT/EP2012/068025 is a Non-Provisional of U.S. Provisional Application No. 61/535,378, which was filed on Sep. 16, 2011. This application is based upon and claims the benefit of priority to European Application No. 11181548.6, which was filed on Sep. 16, 2011.

The invention relates to a coating formed on a substrate comprising (a) a NIR transparent organic pigment and/or a NIR reflective inorganic pigment, (b) a dye having a transmittance of at least 75% in the wavelength range of 700-2500 nm and (c) optionally an effect pigment. The coating system is suitable for an exterior-use coating like an industrial coating or a coating for vehicles, especially an automotive finish. Further, the invention relates to the use of said dye for improving the jetness of a coating.

Carbon black is widely used in coatings to impart a black color the property of which is referred to as "jetness". More jet blacks appear blacker than those having less jet characteristics. Jetness is a complex function of surface area, primary particle size and degree of dispersion in the final coating. Carbon black is added to plastics or coatings not only to make the medium black but also to change the tint characteristics of other colors. Further, carbon black is often added in small amounts in automotive finishes of any color for processing safety reasons.

Automotive jet black colors are created with carbon black, sometimes tinted with dyes to improve the jetness. However, carbon black strongly absorbs invisible near infrared (NIR) radiation that accounts more than 50% of total incident solar energy. This causes a severe heat built up. In order to significantly reduce the heating effect under sunlight, mainly in dark shades, carbon black may be replaced with NIR transparent pigments or NIR reflective pigments, for example with Color Index (C.I.) Pigment Black 32 or C.I. Pigment Brown 29 or pigment preparations based thereof, etc. In case of black coatings comprising carbon black the total solar reflectance (TSR) is less than 5%, whereas coatings comprising C.I. Pigment Black 32 or C.I. Pigment Brown 29, for instance, achieve TSR values in excess of 30% (achievable TSR value is dependent on color, formulation, substrate and film thickness). However, the use of said pigments in coating applications does not exhibit the desired jetness, but a milky or hazy dark coating is obtained.

WO 2008/097895 A2 discloses a layered coating composition for use in producing a cool dark coating composition which includes an IR reflecting layer, having IR-reflective pigments in a resinous binder whereon a radiation absorbing layer including nano-sized pigments dispersed in a resinous binder is coated.

WO 2011/56564 A2 discloses an IR-reflective coating composition and cured coatings deposited on a substrate. Said composition comprises a colored and/or opaque IR-reflective pigment and an IR-transparent pigment, wherein the cured coating exhibits a total solar reflectance of at least 15%.

There is a continuing need for improved coloristics and functionality in coatings. Therefore, it is an object of the present invention to provide a coating material which provides colorations having advantageous performance properties, especially high brilliance and improved jetness and chroma properties, wherein the reduced heating effect under sunlight should not be influenced.

It has now been found that a coating formed on a substrate with the desired properties is obtained.

Accordingly, in a first aspect the invention relates to a coating formed on a substrate comprising a polymeric binder,
(a) an organic pigment and/or an inorganic pigment;
(b) a dye having a transmittance of at least 75% in the range of from 700 to 2500 nm; and
(c) optionally an effect pigment;
wherein said coating exhibits a total solar reflectance (TSR) of
(i) ≥40%, if 60<$L^*$<100, or
(ii) ≥30%, if 30<$L^*$≤60, or
(iii) ≥20%, if 0<$L^*$≤30,
wherein $L^*$ is the lightness.

The TSR is measured according to ASTM Standard Method E 903-96 using the direct normal solarspectral irradiance from ASTM G159-98. The value $L^*$ is measured at an observation angle of 25°.

Preferably, the invention relates to a coating formed on a substrate comprising
(a) at least one organic pigment and/or at least one inorganic pigment;
(b) at least one dye having a transmittance of at least 75% in the range of from 700 to 2500 nm; and
(c) optionally at least one effect pigment;
wherein said coating is free of carbon black and exhibits a TSR of
(i) ≥40%, if 60<$L^*$<100, or
(ii) ≥30%, if 30<$L^*$≤60, or
(iii) ≥20%, if 0<$L^*$≤30,
wherein $L^*$ is the lightness.

In a preferred aspect, the invention relates to a coating, wherein pigment (a) is a NIR transparent pigment and/or a NIR reflective inorganic pigment.

In a further preferred aspect, the invention relates to a coating formed on a substrate comprising
(a) at least one organic pigment and/or at least one inorganic pigment;
(b) at least one dye having a transmittance of at least 75% in the range of from 700 to 2500 nm; and
(c) optionally at least one effect pigment;
wherein said coating exhibits a TSR of
(i) ≥45%, if 60<$L^*$<100, or
(ii) ≥35%, if 30<$L^*$≤60, or
(iii) ≥25%, if 0<$L^*$≤30.

More preferably, the coating exhibits a TSR of
(i) ≥50%, if 60<$L^*$<100, or
(ii) ≥40%, if 30<$L^*$≤60, or
(iii) ≥30%, if 0<$L^*$≤30.

The term "total solar reflectance" (TSR) used herein is the reflected percentage of irradiated energy from sun in the wavelength range of from 300 to 2500 nm. The TSR measurements are performed in accordance with ASTM Standard Method E 903-96 ("Solar Absorptance, Reflectance and Transmittance of Materials Using Integrating Spheres"), using the direct normal solarspectral irradiance from ASTM G159-98. The TSR values are determined by applying the coating onto a white surface.

The term "near infrared" (NIR) used herein means the wavelength range of from 700 nm to 2500 nm.

The term $L^*$ (lightness) used herein means the lightness in the $L^*a^*b^*$ color space (also referred to as CIELAB) specified by the Commission Internationale de l'Eclairage, wherein $a^*$ and $b^*$ are the chromaticity coordinates. The $L^*$ value is measured at an observation angle of 25°. According to the CIELAB system, $L^*$=100 means the lightest value (white), $L^*$=0 means the darkest value (black). Generally, a $L^*$ value refers to an opaque coating.

The term C* (chrome) used herein means the chroma in the L*C*h color space (also referred to as CIELAB) specified by the Commission Internationale de l'Eclairage, wherein L* is the same lightness as in the L*a*b* color space and h is the hue angle.

The term "NIR transparent" used herein means that a sample predominantly transmits NIR radiation and does predominantly not absorb or reflect NIR radiation.

The term "NIR reflective" used herein means that a sample predominantly reflects NIR radiation and does predominantly not transmit or absorb NIR radiation.

The term "coating" or "coating system" used herein means a film or layer applied on a substrate and dried and/or cured, i.e., final for use. The coating or coating system may comprise one or more layers.

Pigment (a) may in principle be any functional pigment, provided the pigments are transparent or reflective in the NIR wavelength range of from 700 to 2500 nm. Pigment (a) may be at least one organic pigment which is NIR transparent or at least one inorganic pigment which is NIR reflective or a mixture thereof. The at least one organic pigment may be a mixture of up to 10 different pigments, preferably 2 to 5 pigments. The at least one inorganic pigment may be a mixture of up to 10 different pigments, preferably 2 to 5 pigments.

The pigments used herein are preferably present in finely dispersed form. Typically, the organic pigments have an average primary particle size of 800 nm or less, preferably 500 nm or less and more preferably 200 nm or less. The inorganic pigments typically have an average particle size of from 0.1 to 5 µm, especially from 0.1 to 3 µm and in particular from 0.1 to 1 µm. The average particle size may be determined according to DIN ISO 13320:2009.

The NIR transparent, organic pigment may be an organic chromatic or black pigment. For example, the organic pigment may be a perylene pigment, phthalocyanine pigment, diketopyrrolopyrrole pigment, indigo pigment, thioindigo pigment, anthrachinone pigment, indanthrone pigment, azo pigment including a monoazo, disazo and azomethine pigment, disazo condensation pigment, isoindoline pigment, isoindolinone pigment, quinacridone pigment, benzimidazolone pigment, pyrazolochinazolone pigment, perinone pigment, dioxazine pigment or a pigment preparation of said pigments.

Preferably, the coating of the invention comprises a perylene pigment, phthalocyanine pigment, dioxazine pigment, diketopyrrolopyrrole pigment, indigo pigment, anthrachinone pigment, monoazo pigment, quinacridone, isoindoline pigment, benzimidazolone pigment, pyrazolochinazolone pigment or a pigment preparation of one of said pigments.

Specific examples of suitable NIR transparent pigments may be Color Index (C.I.) Pigment Yellow 110, 139, 151; C.I. Pigment Orange 69, 73; C.I. Pigment Red 122, 179, 202, 254, 282; C.I. Pigment Brown 29; C.I. Pigment Violet 19; C.I. Pigment Blue 15:1, 15:2, 15:3, 15:4, 15:6, 60; C.I. Pigment Green 7, 36; C.I. Pigment Black 31 and 32.

Preferred organic pigments are black pigments based on perylene, for example C.I. Pigment Black 31 and 32 (N,N'-diphenylethyleneperylene-3, 4:9,10-tetracarboximide and N,N'-di(p-methoxytolyl)-perylene-3,4:9,10-tetracarboximide, respectively). Further, a perylene pigment, as described in WO 2005/078023 A2, which comprises one of the isomers of the general formula Ia or Ib or a mixture thereof,

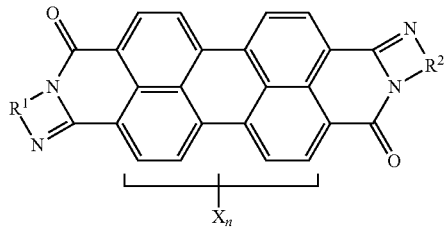

(Ia)

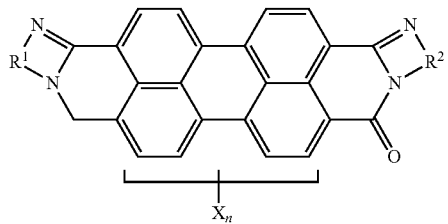

(Ib)

in which $R^1$, $R^2$ are each independently phenylene, naphthylene or pyridylene, each of which may be mono- or polysubstituted by $C_1$-$C_{12}$alkyl, $C_1$-$C_6$alkoxy, hydroxy, nitro and/or halogen; X is halogen; and n is from 0 to 4. A preferred pigment of said formulae is a perylene pigment comprising one of the isomers of the general formula Ia' or Ib' or a mixture thereof,

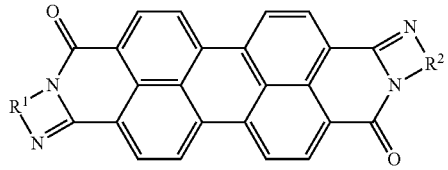

(Ia')

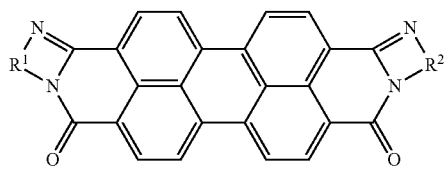

(Ib')

in which $R^1$ and $R^2$ are the same and are unsubstituted phenylene or naphthylene, especially a cis/trans isomer mixture of formula Ia/Ib, wherein $R^1$=$R^2$=1,2-phenylene; n=0 or $R^1$=$R^2$=1,8-naphthylene; n=0; or a cis/trans isomer mixture of formula Ia'/Ib', wherein $R^1$=$R^2$=1,2-phenylene or $R^1$=$R^2$=1,8-naphthylene.

Suitable organic pigments are commercially available under the trademarks Paliotol® Yellow L 2146 HD, Irgazin® Yellow L 2110, Chromopthal® Yellow L 1061 HD, Heliogen® Green L 9361, Heliogen® Green L 8735, Heliogen® Blue L 6960 HD, Heliogen® Blue L 6905 F, Heliogen® Blue L 6700 F, Paliogen® Blue L 6480, Paliogen® Blue L 6360, Paliotol® Orange L 2930 HD, Irgazin® Orange L 2990 HD, Irgazin® Orange L 3250 HD, Irgazin® Red L 3660 HD, Irgazin® Red L 3670 HD, Paliogen® Red L 3885, Paliogen® Red L 3920, Cinquasia® Magenta L 4400, Cinquasia® Violet L 5120, Cromophtal® Violet GT, Hostaperm® Violet RL, Hostaperm® Rosa E, Paliogen® Black L 0086, Paliogen® Black EH 0788 and Lumogen® Black FK 4281.

The inorganic pigment (b) may be any NIR reflective pigment, for example, C.I. Pigment Yellow 53, 184, C.I.

Pigment Brown 24, 29, 33, 35, C.I. Pigment Blue 28, 36, C.I. Pigment Green 17, 26, 50, or C.I. Pigment Black 12, 30.

Suitable organic pigments are commercially available under the trademarks Sicotan® Yellow L 2110, Sicotan® Yellow L 1910, Sicopal® Yellow L 1120, Sicotan® Yellow L 1010, Sicopal® Green K 9710, Sicopal® Blue L 6210, Sicopal® Orange L 2430 and Sicopal® Black L 0095.

The above mentioned pigments (a) may also be used in form of suitable pigment preparations. Preparations of organic pigments usually comprise derivatives of said pigments, which derivatives may contain some or all of the pigment chromophore in their molecular structure and preferably have acidic or basic groups. Pigment derivatives may conveniently be prepared by partially reacting a pigment with adequate reagents, thus preferably forming pigments on which surface a continuous or discontinuous layer or spots of the derivative is present. Further, useful pigment preparations may comprise non-ionic surface-active additives based on polyethers and/or anionic water-soluble surface-active additives based on acidic esters of these polyethers, on polymers of ethylenically unsaturated carboxylic acids and/or on polyurethanes. Suitable examples are, for example, described in WO 03/64540, WO 03/66743, WO 04/00903, WO 0429159, WO 04/46251, WO 04/50770 and US 2008/0190319.

Suitable organic pigment preparations are, for example, commercially available under the trademarks Luconyl® NG Yellow 1260, Luconyl® NG Yellow 2350, Luconyl® NG Green 9360, Luconyl® NG Green 8730, Xfast® Green 8730, Luconyl® NG Blue 7080, Luconyl® NG Blue 6900, Xfast® Blue 7080, Xfast® Blue 6875, Luconyl® NG Orange 3100, Xfast® Orange 3100, Luconyl®NG Red 3750, Luconyl® NG Red 3860, Xfast® Red 3860, Luconyl® NG Magenta 4790, Xfast® Magenta 4790 and Luconyl® NG Violet 5300.

Suitable inorganic pigment preparations are, for example, commercially available under the trademarks Luconyl® NG Yellow 1102, Luconyl® NG Yellow 1995, Xfast® Yellow 1102, Xfast® Yellow 1990, Luconyl® NG Green 9990, Xfast® Green 9990, Luconyl® NG Turquoise 9110, Luconyl® NG Blue 6310, Luconyl® NG Blue 6120, Xfast® Blue 6310, Luconyl® NG Orange 2430, Luconyl® NG Red 3395, Xfast® Red 3390, Luconyl® NG Black 0095, Xfast® Black 0095, Luconyl® NG White 0022, and Xfast® White 0025.

The at least one dye (b) may in principle be any dye, provided the dye is transmissive of at least 75% in the NIR wavelength range of from 700 to 2500 nm. Preferably, the transmittance is at least 80%, more preferably at least 85%. The transmittance is measured in a solution of ethanol (1% or 0.4% by weight, 1 mm cuvette).

Preferably, the dye (b) used has in each case a hue which is comparable to the pigments (a), in order to achieve a particularly intensive coloration of the coating materials. However, it is also possible to use a dye (b) which differs in hue, thereby enabling the coloration to be shaded. Preferably, one or a mixture of two or three dyes is used.

Suitable dyes may be selected from azo dyes, azomethine dyes, xanthene dyes, anthrachinone dyes, metal complex dyes or phthalocyanine dyes, preferably metal complex dyes.

Specific examples may be C.I. Solvent Yellow 79, 81, 82, 88 and 89; C.I. Solvent Orange 11, 54, 56 and 99; C.I. Solvent Brown 42, 43 and 44; C.I. Solvent Red 118, 122, 125, 127, 130, 160, 199 and 233; Solvent Blue 67 and 70; and C.I. Solvent Black 27, 28 and 29.

Suitable dyes may also be those commercially available under the trademark Orasol® Yellow 152, 190, 081, 141, 157; Orasol® Orange 245, 251, 247, RG, 272; Orasol® Brown 322, 324, 326; Orasol® Red 330, 385, 363, 335, 355, 365, 395, 471; Orasol® Pink 478; Orasol® Blue 825, 855, GL; Orasol® Black X45, RLI, X51 and X55.

Preferably, the coating system comprises the dye (b) in an amount of from 0.01 to 10.0% by weight, for example 0.1 to 8.0% by weight, preferably 0.3 to 8.0% by weight, more preferably 0.5 to 6.0% by weight and most preferably 0.8 to 3.0% by weight, based on the total weight of pigment (a).

Dyes which are not soluble in the application medium may also be used in combination with a suitable emulsifier. For example, a metal complex dye, like C.I. Solvent Black 29, which is dispersible in water may be employed with a suitable emulsifier like a non-ionic surfactant in waterborne formulations.

Optionally, the coating comprises an effect pigment (c) exhibiting a sparkling effect which is advantageously used in an automotive coating.

Effect pigments (c) are generally lamellar pigments usually used in effect coatings such as metal pigments, e.g. those of titanium, aluminum or copper; interference pigments such as metal oxide-coated metal pigments, e.g. aluminum coated with titanium dioxide or mixed oxides or aluminum flakes coated with iron oxide (e.g. Paliocrom® effect pigments), coated mica, e.g. mica coated with titanium dioxide or mixed oxides, microtitanium dioxide, lamellar iron oxide (micaceous iron oxide), molybdenum sulfide pigments, bismuth oxychloride flakes, coated glass flakes. Preferred are metal pigments, interference pigments, or coated mica pigments, especially preferred are coated mica pigments.

Accordingly, the invention also relates to a coating formed on a substrate comprising a polymeric binder, (a) an organic pigment and/or an inorganic pigment;
(b) a dye having a transmittance of at least 75% in the range of from 700 to 2500 nm; and
(c) an effect pigment;
wherein said coating exhibits a TSR of
(i) ≥40%, if $60<L^*<100$, or
(ii) ≥30%, if $30<L^*≤60$, or
≥(iii) 20%, if $0<L^*≤30$, and $L^*$ is the lightness.

Preferably, the coating comprises the effect pigment (c) in an amount of from 0.1 to 60% by weight, preferably 1 to 50% by weight, more preferably 20 to 40% by weight, based on the total weight of pigment (a). The presence of effect pigments may has a significant influence on the TSR values in connection with an organic NIR transparent pigment and/or inorganic NIR reflective pigment. For example, an increasing amount of a $TiO_2$-coated mica pigment increases the TSR value of a coating comprising an organic NIR transparent pigment and/or a NIR reflective pigment, preferably a NIR transparent organic pigment.

Preferred pigment (a)/dye (b) combinations are, for example,

C.I. Pigment Black 32 and C.I. Solvent Black 29;
C.I. Pigment Black 31 and C.I. Solvent Black 29;
C.I. Pigment Black 32 and C.I. Pigment Blue 15:2 and C.I. Solvent Black 29;
C.I. Pigment Black 31 and C.I. Pigment Blue 15:2 and C.I. Solvent Black 29;
C.I. Pigment Brown 32 and C.I. Solvent Black 29;
C.I. Pigment Brown 29 and optionally a black perylene pigment like C.I. Pigment Black 32 and
C.I. Solvent Black 29;
C.I. Pigment Blue 60 and Solvent Blue 70;
C.I. Pigment Blue 15.1 and Solvent Blue 70;
C.I. Pigment Blue 15.2 and Solvent Blue 70;

C.I. Pigment Blue 15.3 and Solvent Blue 70;
C.I. Pigment Blue 15.4 and Solvent Blue 70;
C.I. Pigment Blue 15.6 and Solvent Blue 70;
C.I. Pigment Red 254 and C.I. Solvent Red 122.

Said combinations may also comprise one or more effect pigments.

Advantageously, the coating comprises a black pigment which may be a NIR transparent, organic pigment or a NIR reflective inorganic pigment, and a further NIR transparent chromatic organic pigment. The amount of the black pigment may vary dependent on the desired color of the coating. The amount of the black pigment (a') may be of from 3 to 95% by weight, based on the total weight of pigment (a). Especially, the black pigment (a') is combined with a blue NIR transparent pigment or a green NIR transparent pigment.

The NIR transparent organic pigment may be used in a coating applied onto a NIR reflective substrate or formulated in combination with NIR reflective inorganic pigments.

IR-reflective pigments may be used independently of the substrate, although the effect may be further enhanced by using a reflective substrate.

It should be ensured that IR radiation is reflected either by the coating system itself or by its background, which may be achieved by adding extraneous particles having a high level of scattering in the IR region, such as titanium dioxide pigments and inorganic mixed phase pigments (for example Sicotan® pigments, BASF), or extraneous particles having a high level of reflection in the IR region, such as aluminum flakes and luster pigments, for example those based on coated aluminum platelets, to the coating composition, or using metallic backgrounds or white backgrounds having diffuse scattering.

Any substrate material can be coated with the coating of the present invention, including such materials as glass, ceramics, plastics, smooth-surfaced composites and metallic substrates. Especially, the coating of the present invention is particularly adapted for metallic substrates or plastic substrates. The substrate may be bare substrate material or, in the case of metal substrates, may be pretreated to impart corrosion resistance as by phosphatizing, or electrocoating like cathodic dip coating, or other similar treatments well known in the art.

Examples of metallic substrates which can be coated with the coating system of the present invention include steel, aluminum, titanium, alloys thereof, etc.

The coating is specifically an exterior-use coating, in particular an architectural coating, industrial coating or a coating used for any transportation vehicles, like an automotive coating including an automotive finish system.

Accordingly, the invention preferably relates to a coating as described in any aspect above, which is an industrial coating or an automotive coating. A coating comprising an effect pigment is especially suitable for a multilayer coating for the automotive industry. Effect pigments are usually incorporated into the basecoat layer, as described below.

The coating typically comprises a polymeric binder which may in principle be any binder customary in industry. The polymeric binder may be a film forming binder, for example a thermosetting film forming binder or a thermoplastic film forming binder. The amount of colorants, i.e. pigment (a), dye (b) and optionally effect pigment (c) may be in the range of from 5 to 40% by weight, preferably 10 to 30% by weight, based on the non-volatile part of the applied coating composition.

The components (a), (b) and optionally (c) may be incorporated by known methods in any coating formulations of various solids content, such as low-solids coating compositions (<30% by weight non-volatile part), normal-solids coating compositions (30-60% by weight), medium-solids coating compositions (60-70% by weight) or high-solids coating compositions (>70% by weight). Solvent-borne or water-borne formulations may be used. Components (a), (b) and optionally (c) may also be incorporated in powder coatings having nearly 100% solids content.

The coating may be a one layer system or a multilayer system. The thickness of a coating of a one layer system may be of from 30 to 200 µm, preferably 50 to 150 µm and more preferably 70 to 100 µm. A multilayer system may comprise optionally a primer, one or two basecoat layers, and a clearcoat, which is typically for a coating for the automotive industry. The thickness of the coating as a whole may be of from 30 to 200 µm, preferably 50 to 150 µm and more preferably 70 to 100 µm.

In a multilayer system, a primer is generally applied on top of the electrocoat layer having a thickness of approximately 20-40 µm. A primer may comprise white pigments such as titanium dioxide (C.I. Pigment White 6), zinc white, pigment grade zinc oxide, zinc sulphide or lithopone, preferably titanium oxide. The primer may also comprise NIR reflective pigments as described above, for example, C.I. Pigment Yellow 53, 184, C.I. Pigment Brown 24, 29, C.I. Pigment Blue 28 or C.I. Pigment Green 50. In case of more basecoat layers, one of the basecoat layers may also replace a primer layer.

The basecoat material, which imparts the desired color to the automobile body by appropriate pigments, may comprise any suitable film forming material conventionally used in this art. Suitable film forming materials for use in formulating the basecoat compositions include, for example, acrylics, alkyds, polyurethanes, polyesters and aminoplast resins. Provided the binders are curable binders, they are normally used together with a hardener and/or accelerator.

The basecoat may be deposited out of an aqueous carrier or conventional volatile organic solvents such as aliphatic, cycloaliphatic and aromatic hydrocarbons, esters, ethers, ketones and alcohols, for example toluene, xylene, butyl acetate, acetone, methyl isobutyl ketone, butyl alcohol, etc. and mixtures thereof.

The clearcoat material, which imparts the desired gloss, may comprise any suitable film forming material conventionally used in this art, for example thermosetting alkyd-melamine combinations or thermosetting acrylics or polyurethane resins. Commercially available examples may be clearcoats of tradenames Duraclear® or Ureclear®.

The basecoat and the clearcoat may be applied by any conventional methods in this art such as brushing, spraying, dipping, flow coating etc. Typically spray application is used, especially for automotive finishing. Various types of spraying can be utilized such as compressed air spraying, electrostatic spraying, hot spraying techniques, airless spraying techniques etc. The application of the coating system of the present invention generally follows the application to the substrate of a conventional corrosion resistant layer or electrocoat. To this substrate a primer may be coated, said layer is created largely by applying a baked-on coating, e.g. by electrostatic high rotation bells and subsequent baking at temperatures above 130° C. A basecoat may be applied thereon in one or two layers. The basecoat is typically applied in a thickness of from about 10 µm to about 60 µm and preferably about 12 µm to about 30 µm. This thickness can be applied in a single coating pass or a plurality of passes with very brief drying ("flash") between applications of coats.

Once the basecoat has been applied, the topcoat or clearcoat may be applied after allowing the basecoat to be flashed off, dried and optionally cured, for example by heat curing. The clearcoat composition may also be applied wet-on-wet over a basecoat composition. The clearcoat is generally applied thicker than the preceding coat (preferably in a thickness of about 25 µm to 60 µm) and can also be applied in a single or multiple pass.

Where appropriate, additives may also be used in customary manner as further ingredients in the coating system. Suitable additives may be, for example, surfactants, dispersants, waxes, fillers, defoamers, antidust agents, extenders, preservatives, dryness retarders, rheology control additives, wetting agents, antioxidants, UV absorbers, light stabilizers or combinations thereof.

The additives may be present in an amount of from 0 to 20% by weight, preferably 0-10% by weight, based on the total weight of the coating.

For coloring a coating composition, the colorant components (a), (b) and optionally (c) and the organic film forming material comprising the high molecular weight organic material may generally be finely dispersed or dissolved, optionally together with the above-mentioned additives, in an organic and/or aqueous solvent or solvent mixture using methods conventionally known in the art.

The coating of the invention comprises preferably a NIR transparent organic pigment as pigment (a), and the substrate is a metallic substrate as defined above.

The coating of the invention may also comprise more than one layer, as mentioned above. The dye may be comprised in one or more layers.

Accordingly, the coating of the invention is preferably a multilayer coating,
said multilayer comprises a primer, a basecoat comprising one or two layers, and a clearcoat as the outer layer, wherein
the organic pigment (a) is comprised in the basecoat,
the inorganic pigment (a) is comprised in the primer, and
the dye (b) is comprised in the clearcoat or the basecoat.

Especially, the coating of the invention is a multilayer coating,
said multilayer comprises a primer, a basecoat comprising one or two layers, and a clearcoat as the outer layer, wherein
the organic pigment (a) is comprised in the basecoat,
the inorganic pigment (a) is comprised in the primer, and
the dye (b) is comprised in the clearcoat.

Further preferred is a coating, wherein the coating is a multilayer coating is defined as above, and the organic pigment (a) is comprised in the basecoat,
the dye (b) is comprised in the clearcoat or the basecoat, and the primer comprises a white pigment such as titanium dioxide (C.I. Pigment White 6), zinc white, pigment grade zinc oxide, zinc sulphide and lithopone, preferably titanium oxide.

The coating of the invention may also comprise at least one organic pigment (a) and at least one inorganic pigment (a) in the same layer, for example in the basecoat. The basecoat may comprise additionally the dye (b). Alternatively the clearcoat may comprise the dye (b).

The optional effect pigment may be present in the basecoat. In case of two basecoat layers the optional effect pigment is preferably present in the layer adjacent to the clearcoat.

Thus, the coating of the invention is preferably a multilayer coating, said multilayer comprises a primer, a basecoat comprising one or two layers, and a clearcoat as the outer layer, wherein
the organic pigment (a) and the effect pigment (c) are comprised in the basecoat,
the inorganic pigment (a) is comprised in the primer, and
the dye (b) is comprised in the clearcoat or the basecoat.

Further preferred is a coating, wherein the coating is a multilayer coating is defined as above, and the organic pigment (a) and the effect pigment (c) are comprised in the basecoat, the dye (b) is comprised in the clearcoat or the basecoat, preferably in the clearcoat, and the primer comprises a white pigment as defined above.

Especially preferred is a coating in any aspect described herein before, wherein the dye (b) is comprised in the outer layer such as the clearcoat. Alternatively, a coating is also especially preferred, wherein the dye (b) is comprised in the basecoat, in case of two basecoat layers in the layer adjacent to the clearcoat layer.

The inventive coating is especially suitable for dark colored and black coatings, for example dark blue or black coatings. In general, said coatings exhibit a lightness of L* of ≤30. Black coatings may exhibit a lightness of ≤20, preferably ≤15, especially ≤12.

A more preferred coating is a black coating based on a NIR transparent black perylene pigment and optionally a NIR transparent blue pigment and a black dye as described above. The perylene pigment may be used in combination with a NIR transparent blue pigment, for example a phthalocyanine pigment such as C.I. Pigment Blue 15:2, 15:6 or an indanthrone pigment like C.I. Pigment Blue 60. The perylene pigment and optionally a blue pigment may be combined with a dark NIR reflective inorganic pigment like C.I. Pigment Brown 29 in the same coating layer. The inorganic pigment may also be present in an underlying layer such as the primer. Alternatively, only a NIR transparent pigment may be present in a layer. In both alternatives the dye may be present in the same layer as the organic pigment or the dye may be present in the layer coated on the layer comprising the organic pigment.

Thus, in a preferred aspect the coating comprises
(a) a perylene pigment and/or C.I. Pigment Brown 29, and
(b) a dye selected from the group consisting of C.I. Solvent Black 27, 28 and 29, preferably C.I. Solvent Black 29.

Further, in a preferred aspect the coating comprises
(a) a perylene pigment and/or C.I. Pigment Brown 29,
(b) a dye selected from the group consisting of C.I. Solvent Black 27, 28 and 29, preferably C.I. Solvent Black 29, and
(c) optionally an effect pigment, preferably a metal pigment, an interference pigment or a coated mica pigment.

The perylene pigment may be at least one of the group consisting of C.I. Pigment Black 31, 32 and a perylene pigment of formula Ia or Ib, especially of formula Ia' or Ib', or a mixture thereof.

Thus, a more preferred coating is a coating comprising
(a) at least one perylene pigment and/or C.I. Pigment Brown 29,
(b) a dye selected from the group consisting of C.I. Solvent Black 27, 28 and 29, preferably C.I. Solvent Black 29, and
(c) optionally an effect pigment, preferably a metal pigment, an interference pigment or a coated mica pigment,
wherein the perylene pigment is selected from the group consisting of C.I. Pigment Black 31, 32, and a perylene pigment comprising one of the isomers of the general formula Ia' or Ib' or a mixture thereof,

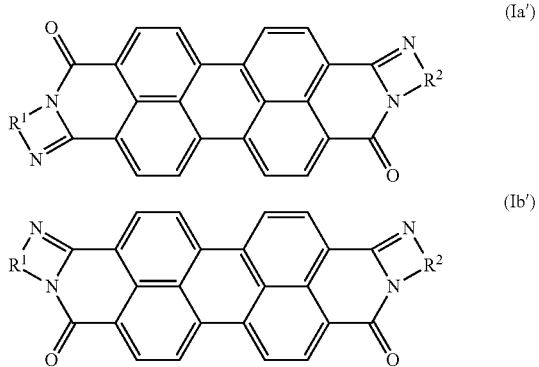

in which $R^1$ and $R^2$ are the same and are unsubstituted phenylene or naphthylene.

The coating based on a perylene pigment and/or C.I. Pigment Brown 29, as described above, may exhibit a total solar reflectance of at least 20%, preferably at least 25% and especially at least 30%. The lightness L* may be in the range of from 0 to 30, preferably from 0 to 20, more preferably from 0 to 15, especially from 0 to 12. Preferably, the coating comprises an effect pigment in an amount of 0.1 to 20% by weight, preferably 0.1 to 10%, based on pigment (a).

In a preferred aspect, the invention relates to a coating comprising a polymeric binder
(a) a perylene pigment and/or C.I. Pigment Brown 29,
(b) a dye selected from the group consisting of C.I. Solvent Black 27, 28 and 29, and
(c) optionally an effect pigment, preferably a metal pigment, an interference pigment or a coated mica pigment,
wherein the coating exhibits a TSR of at least 25% and L* is ≤20, especially ≤15.

If a chromatic coating is desired, for example a blue or red colored coating, the dye may be present in a monolayer coating or in any layer of a multiple layered coating. In all chromatic embodiments, the improved color depth may be indicated mainly by improved chroma. In a black colored coating, the improved color depth is mainly indicated by improved jetness.

Further, in a preferred aspect the coating comprises
(a) an organic pigment selected from the group consisting of C.I. Pigment Blue 15:1, 15:2, 15:3, 15:4, 15:6 and 60 and/or an inorganic pigment selected from the group consisting of C.I. Pigment Blue 28 and 36;
(b) a dye selected from the group consisting of C.I. Solvent Blue 67 and 70; and
(c) optionally an effect pigment, preferably a metal pigment, an interference pigment or a coated mica pigment,
wherein the coating exhibits a TSR of
(ii) ≥30%, if 30<L*≤60, or
(iii) ≥20%, if 0<L*≤30, wherein L* is the lightness.

In a further aspect, the invention is directed to the use of a dye having a transmittance of at least 75% in the wavelength range of from 700 to 2500 nm for improving the jetness of a coating exhibiting a total solar reflectance
(i) ≥40%, if 60<L*<100, or
(ii) ≥30%, if 30<L*≤60, or
(iii) ≥20%, if 0<L*≤30, wherein L* is the lightness.

Preferably, the dye having a transmittance of at least 75% in the wavelength range of from 700 to 2500 nm is C.I. Solvent Black 27, 28 or 29, preferably C.I. Solvent Black 29. Accordingly, the invention relates to the use of C.I. Solvent Black 27, 28 or 29, especially C.I. Solvent Black 29, for improving the jetness in a coating exhibiting a TSR of ≥20%, if 0<L*≤30, wherein L* is the lightness.

In a further aspect, the invention is directed to the use of a dye having a transmittance of at least 75% in the wavelength range of from 700 to 2500 nm for lowering the lightness L* of the coating exhibiting a TSR of
(i) ≥40%, if 60<L*<100, or
(ii) ≥30%, if 30<L*≤60, or
(iii) ≥20%, if 0<L*≤30, wherein L* is the lightness.

In a further aspect the invention relates to a process for coating the surface of a substrate, which process comprises the consecutive steps of
(i) applying a coating composition comprising a polymeric binder and
(a) at least one organic pigment and/or at least one inorganic pigment;
(b) at least one dye having a transmittance of at least 75% in the range of from 700 to 2500 nm; and
(c) optionally an effect pigment;
(ii) optionally removing solvent, and
(iii) forming a coating as defined in any aspect described above.

The coating may have a thickness of 30 to 200 μm.

Preferably, process step (i) includes a step of applying a basecoat composition and subsequent applying a clearcoat composition, wherein component (a) and optionally (c) are comprised in the basecoat composition and component (b) is comprised in the basecoat or clearcoat composition.

The formation of the film or curing may be performed by physically or chemically drying which is known in the art and usually dependent on the polymeric binder used. Physical drying may be evaporation of organic solvents and/or water or cooling of polymer melts when a powder coating is used. Chemical drying may be reacting of binder components, for example by polymerization or cross-linking, with heat or radiation. Usually, curing may comprise a flash at ambient or elevated temperature followed by thermally baking. In some embodiments, drying may occur at ambient temperature of about 20 to about 180° C. Usually, the basecoat and clearcoat will be cured in one step, optionally together with the primer.

The coatings of the invention provide excellent color depth and chroma, resp., and jetness, especially in automotive finishes and industrial coatings. They show brilliant colors and outstanding gloss for all color shades without any milky appearance or haze or undertone. Using the dye has no influence of the NIR absorption. The chroma is enhanced, especially in dark colored coatings, such as blue or green colored coatings.

Further, the lifetime of coated material is increased. The coatings show excellent light and weather fastness.

The following Examples illustrate the invention without limiting the scope thereof (% and parts are by weight where not otherwise specified).

EXAMPLES

L*a*b* color measurements are made using Delta Color Spectraflash 600. TSR measurements are made using UV-VIS-NIR-Spectrometer, Varian Cary 5000.

The following blends of colorants are incorporated into a conventional medium-solids basecoat composition (cellulose acetate butyrate (CAB), melamine/polyethylene (PE) and n-butyl acetate). The resulting coating composition (colorant/binder weight ratio is 0.18) is applied by spray-coating and drying by room temperature to yield a thickness of the coating of from 10-15 μm. An alu panel coated with a primer comprising a white pigment is used as the substrate. The basecoat is overcoated by a 1K clearcoat of a thickness of about 40 μm.

Example 1

4.90 parts MagnaPearl® 3103 (mica coated with titanium dioxide)
4.90 parts Heliogen® Blue L 6960 (C.I. Pigment Blue 15:2)
22.06 parts Paliogen® Black EH 0788 (a perylene pigment)
66.18 parts Paliogen® Black L 0086 (C.I. Pigment Black 32)
1.96 parts Neozapon® Black X55 (=Orasol® Black X55) (C.I. Solvent Black 29)

Example 2

4.81 parts MagnaPearl® 3103
4.81 parts Heliogen® Blue L 6960
21.63 parts Paliogen® Black EH 0788
64.90 parts Paliogen® Black L 0086
3.84 parts Neozapon® Black X55

Example 3

4.72 parts MagnaPearl® 3103
4.72 parts Heliogen® Blue L 6960
21.22 parts Paliogen® Black EH 0788
63.68 parts Paliogen® Black L 0086
5.66 parts Neozapon® Black X55

Comparative Example 1

5 parts MagnaPearl® 3103
5 parts Heliogen® Blue L 6960
22.5 parts Paliogen® Black EH 0788
67.5 parts Paliogen® Black L 0086

TABLE 1

|  | ΔL* | TSR (%) |
| --- | --- | --- |
| Comparative Example 1 | Reference L* = 9.4 | 25 |
| Example 1 | −0.9 | 25 |
| Example 2 | −1.5 | 25 |
| Example 3 | −2.5 | 25 |

The values of the resulting ΔL* demonstrates the improved jetness of the black coatings compared to coatings without a dye. According to the L*a*b* color space (also referred to as CIELAB) L* indicates lightness and a* and b* are the chromaticity coordinates. A lower L* value means a greater level of jetness. A visual difference of ΔL*≥0.3 may be recognized by a person skilled in the art as an improvement.

Example 4

The following blend of colorants is incorporated in a conventional medium-solids basecoat composition (CAB, melamine/PE, n-butyl acetate).
The resulting coating composition (colorant/binder weight ratio is 0.18) is applied by spray-coating and drying at room temperature to yield a thickness of the coating of from 10-15 μm.
33.3 parts Paliogen® Black EH 0788
66.7 parts Paliogen® Black L 0086
A clearcoat composition (one-component acrylic clearcoat) containing 1 wt.-% of Neozapon® X55 is applied on the base coat by spray-coating (wet-on-wet) and drying at 130° C. for 1 hour (thickness about 40 μm).

Comparative Example 2

33.3 parts Paliogen® Black EH 0788
66.7 parts Paliogen® Black L 0086
A clear coat without a dye is applied onto the base coat.

Comparative Example 3

A clear coat without a dye but with 1% by weight of Heliogen® Blue L 6960 is applied onto the base coat.

TABLE 2

|  | ΔL* | TSR (%) |
| --- | --- | --- |
| Comparative Example 2 | Reference L* = 9.4 | 26 |
| Comparative Example 3 | 0 | 26 |
| Example 4 | −6.2 | 25 |

The difference of lightness of −6.2 demonstrates a highly improved jetness compared to a coating without any dye. The presence of a NIR transparent pigment has no influence on the jetness.

Example 5

The following blend of colorants is incorporated in a conventional medium-solids basecoat composition (CAB, melamine/PE, n-butyl acetate).
The resulting coating composition (colorant/binder weight ratio is 0.18) is applied by spray-coating and drying at room temperature to yield a thickness of the coating of from 10-15 μm.
50 parts of Lumina® Pearl Radiance 1303D (TiO$_2$ coated mica pigment)
24.9 parts of Heliogen® Blue L 6905 (C.I. Pigment Blue 15:2)
24.9 parts of Heliogen® Blue L 6950 (C.I. Pigment Blue 15:1)
0.2 parts of Orasol® Blue 855 (Solvent Blue 70).

Example 6

The following blend of colorants is incorporated into a conventional medium-solids basecoat composition (cellulose acetate butyrate (CAB), melamine/polyethylene (PE) and n-butyl acetate) The resulting coating composition (colorant/binder weight ratio is 0.18) is applied by spray-coating and drying by room temperature to yield a thickness of the coating of from 10-15 μm. The coating has a brilliant blue color.
50 parts of Lumina® Pearl Radiance 1303D
25 parts of Heliogen® Blue L 6905
25 parts of Heliogen® Blue L 6950
A clearcoat composition containing 0.2 wt.-% of Orasol® Blue 855, based on 100 wt.-% of the clearcoat composition, is applied on the basecoat by spray-coating and drying at 130° C. for 1 hour (thickness about 40 μm).

Comparative Example 4

Example 6 is repeated with the exception that the following blend of colorants is used
50 parts of Lumina® Pearl Radiance 1303D
25 parts of Heliogen® Blue L 6905
25 parts of Heliogen® Blue L 6950

TABLE 3

|  | ΔL* | ΔC* | TSR (%) |
|---|---|---|---|
| Comparative Ex. 4 | Reference L* = 40.8 | C* = 46.8 | 38 |
| Example 5 | −0.7 | 0.4 | 38 |
| Example 6 | −2.9 | 1.7 | 37 |

The effect of improved jetness and improved chroma can be demonstrated for a blue-colored coating, wherein the effect of in a tinted clearcoat is more significant.

The chroma of the chromatic coating can also be improved. A visual difference of ΔC*≥0.3 may be recognized by a person skilled in the art.

Example 7

Example 6 is repeated with the exception that the following blend of colorants is used in the basecoat:
50 parts of Stapa Metallux 3560 (aluminum pigment)
25 parts of Heliogen® Blue L 6905
25 parts of Heliogen® Blue L 6950

A clearcoat composition containing 0.2 wt.-% of Orasol® Blue 855, based on 100 wt.-% of the clearcoat composition, is applied on the basecoat by spray-coating and drying at 130° C. for 1 hour (thickness about 40 μm).

Comparative Example 5

Example 5 is repeated with the exception that the following blend of colorants is used:
50 parts of Stapa Metallux 3560
25 parts of Heliogen® Blue L 6905
25 parts of Heliogen® Blue L 6950

TABLE 4

|  | ΔL* | ΔC* | TSR (%) |
|---|---|---|---|
| Comparative Ex. 5 | Reference L* = 69.7 | C* = 52.8 | 41 |
| Example 7 | −7.8 | 9.1 | 41 |

Comparative Example 6

Comparative Example 1 is repeated with the exception that the following blend of colorants is incorporated into a conventional medium-solids basecoat composition.
22.8 parts Paliogen® Black L 0086
8.5 parts Heliogen® Green L 8735 (C.I. Pigment Green 7)
50 parts Sicopal® Black L 0095 (C.I. Pigment Brown 29)
18.7 parts Cromophtal® Violet GT (C.I. Pigment Violet 23)

The TSR value of said hazy dark coating is 28.4 and L* is 9.5.

Example 8

Example 1 is repeated with the exception that the following blend of colorants is incorporated into a conventional medium-solids basecoat composition.
21.92 parts Paliogen® Black L 0086
8.17 parts Heliogen® Green L8735
48.08 parts Sicopal® Black K 0095
17.98 parts Cromophtal® Violet GT
3.85 parts Neozapon® Black X55

A brilliant black coating exhibiting a TSR of 28.4 and improved jetness, i.e. a lowered L*, is obtained.

The invention claimed is:

1. A coating formed on a substrate, the coating comprising a primer, a basecoat layer and a clearcoat layer, wherein:
   the basecoat layer comprises:
      a polymeric binder;
      (a) a pigment comprising a near infrared transparent organic pigment;
      (b) a dye having a transmittance of at least 75% in the range of from 700 to 2500 nm; and
      (c) an effect pigment selected from the group consisting of a metal oxide-coated metal pigment, a coated mica pigment, a coated glass flake, and a mixture thereof;
   the primer comprises a near infrared reflective inorganic pigment;
   the basecoat layer and the clearcoat layer do not contain a near infrared reflective inorganic pigment;
   an outer surface of the basecoat layer is directly overcoated by the clearcoat layer;
   the clearcoat layer does not contain a dye;
   the coating exhibits a total solar reflectance (TSR) of
      (i) ≥40%, if 60 <L* <100, or
      (ii) ≥30%, if 30 <L* ≤60, or
      (iii) ≥20%, if 0 <L* ≤30;
   L* is a lightness; and
   the coating is suitable for an exterior-use industrial coating or an automotive coating.

2. The coating according to claim 1, wherein the coating exhibits the TSR of
   (i) ≥45%, if 60 <L* <100, or
   (ii) ≥35%, if 30 <L* ≤60, or
   (iii) ≥25%, if 0 <L* ≤30.

3. The coating according to claim 1, wherein an amount of the dye (b) is from 0.01 to 10.0% by weight, based on a total weight of the pigment (a).

4. The coating according to claim 1, wherein an amount of the effect pigment (c) is from 0.1 to 60% by weight, based on a total weight of the pigment (a).

5. The coating according to claim 1, wherein the pigment (a) comprises a near infrared transparent organic pigment selected from the group consisting of Color Index (C. I.) Pigment Yellow 110, 139, 151; C.I. Pigment Orange 69, 73; C.I. Pigment Red 122, 179, 202, 254, 282; C.I. Pigment Brown 29; C.I. Pigment Violet 19; C.I. Pigment Blue 15:1, 15:2, 15:3, 15:4, 15:6, 60; C.I. Pigment Green 7, 36; C.I. Pigment Black 31, 32; a perylene pigment comprising an isomer of formula Ia' or Ib' or a mixture thereof,

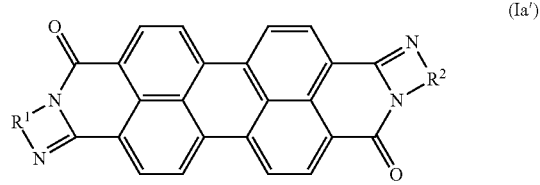

(Ia')

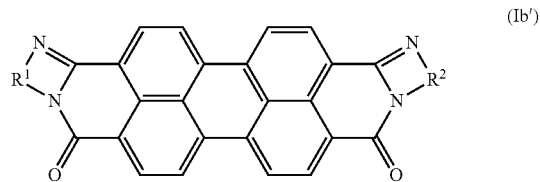

(Ib')

in which R¹ and R² are the same and are unsubstituted phenylene or naphthylene; and a pigment preparation thereof.

6. The coating according to claim 1, wherein the pigment (a) comprises a near infrared reflective inorganic pigment selected from the group consisting of C.I. Pigment Yellow 53, 184, C.I. Pigment Brown 24, 29. 33, 35, C.I. Pigment Blue 28. 36, C.I. Pigment Green 17, 26, 50, C.I. Pigment Black 12, 30 and a pigment preparation thereof.

7. The coating according to claim 1, wherein the substrate is a metallic substrate.

8. The coating according to claim 1, wherein: the basecoat layer comprises one or two layers.

9. The coating according to claim 8, wherein the primer comprises a white pigment.

10. The coating according to claim 1, comprising:
(a) a perylene pigment;
(b) a dye selected from the group consisting of C. I. Solvent Black 27, 28 and 29; and
(c) the effect pigment,
wherein the coating exhibits the TSR of at least 20% and L* is ≤30.

11. The coating according to claim 10, wherein the coating exhibits the TSR of at least 25%, and L* is ≤20.

12. The coating according to claim 1, wherein the dye (b) is selected from the group consisting of an azo dye, an azomethine dye, a xanthene dye, an anthrachinone dye, a metal complex dye, a phthalocyanine dye, and a mixture thereof.

13. The coating according to claim 1, wherein:
the near infrared transparent organic pigment is selected from the group consisting of Color Index (C.I.) Pigment Yellow 110, 139, 151; C.I. Pigment Orange 69, 73; C.I. Pigment Red 122, 179, 202, 254, 282; C.I. Pigment Brown 29; C.I. Pigment Violet 19; C.I. Pigment Blue 15:1, 15:2, 15:3, 15:4, 15:6, 60; C.I. Pigment Green 7, 36; C.I. Pigment Black 31, 32; a perylene pigment comprising an isomer of formula Ia' or Ib' or a mixture thereof,

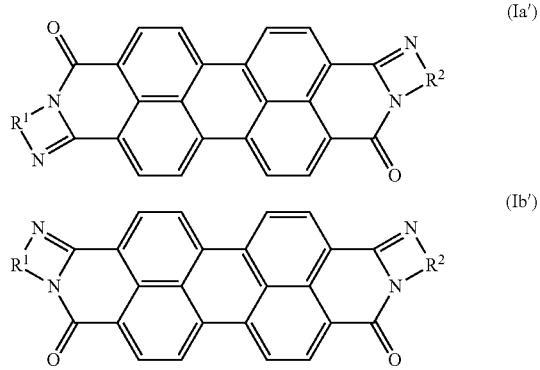

in which R¹ and R² are the same and are unsubstituted phenylene or naphthylene; and a pigment preparation thereof;
the near infrared reflective inorganic pigment is selected from the group consisting of C.I. Pigment Yellow 53, 184, C.I. Pigment Brown 24, 29, 33, 35, C.I. Pigment Blue 28, 36, C.I. Pigment Green 17, 26, 50, C.I. Pigment Black 12, 30 and a pigment preparation thereof; and the dye (b) is selected from the group consisting of an azo dye, an azomethine dye, a xanthene dye, an anthrachinone dye, a metal complex dye, a phthalocyanine dye, and a mixture thereof.

14. The coating according to claim 1, wherein:
an amount of the dye (b) is from 0.01 to 10.0% by weight, based on a total weight of the pigment (a); and
an amount of the effect pigment (c) is from 0.1 to 60% by weight, based on the total weight of the pigment (a).

15. The coating according to claim 1, wherein:
the pigment (a) comprises a near infrared transparent organic pigment which is at least one selected from the group consisting of a perylene pigment, a phthalocyanine pigment, a diketopyrrolopyrrole pigment, an indigo pigment, a thioindigo pigment, an anthrachinone pigment, an indanthrone pigment, an azo pigment, a dsazo condensation pigment, an isoindoline pigment, an isoindolinone pigment, a quinacridone pigment, a benziniidazolone pigment, a pyrazolochinazolone pigment, a perinone pigment, a dioxazine pigment, and a pigment preparation thereof; and
the dye (b) is at least one selected from the group consisting of an azo dye, an azomethine dye, a xanthene dye, an anthrachinone dye, a metal complex dye, and a phthalocyanine dye.

16. The coating according to claim 15, wherein:
an amount of the dye (b) is from 0.01 to 10.0% by weight, based on a total weight of the pigment (a), and
an amount of the effect pigment (c) is from 0.1 to 60% by weight, based on a total weight of the pigment (a).

17. The coating according to claim 1, wherein the effect pigment is a coated mica pigment.

18. A method for improving the jetness of a coating exhibiting a TSR of
(i) ≥40%, if 60 <L* <100, or
(ii) ≥30%, if 30 <L* ≤60, or
(iii) ≥20%, if 0 <L* ≤30,
wherein L* is a lightness,
the method comprising:
including, in the coating, a polymeric binder, (a) a pigment comprising a near infrared transparent organic pigment, (b) a dye having a transmittance of at least 75% in the range of from 700 to 2500 nm, (c) and an effect pigment selected from the group consisting of, a metal oxide-coated metal pigment, a coated mica pigment, a coated glass flake, and a mixture thereof,
wherein:
the coating comprises a primer, a basecoat layer and a clearcoat layer;
the basecoat layer comprises the polymeric binder, the pigment (a), the dye (b) and the effect pigment (c);
the primer comprises a near infrared reflective inorganic pigment;
the basecoat layer and the clearcoat layer do not contain a near infrared reflective inorganic pigment;
an outer surface of the basecoat layer is directly overcoated by the clearcoat layer;
the clearcoat layer does not contain a dye; and
the coating is suitable for an exterior-use industrial coating or an automotive coating.

19. The coating according to claim 11, wherein L* is ≤15.

20. A method for coating a surface of a substrate, the method comprising:
applying, to a surface of a substrate, a primer;
applying, to a surface of the primer, a coating composition comprising a polymeric binder, (a) a pigment comprising a near infrared transparent organic pigment, (b) a dye having a transmittance of at least 75% in the range from 700 to 2500 nm, and (c) an effect pigment selected from the group consisting of a metal oxide-coated metal pigment, a coated mica pigment, a coated glass flake, and a mixture thereof;

optionally removing a solvent to form a basecoat layer; and then applying, to a surface of the basecoat layer, a clearcoat layer, to obtain a coating which exhibits a total solar reflectance (TSR) of
  (i) $\geq 40\%$, if $60 < L^* < 100$, or
  (ii) $\geq 30\%$, if $30 < L^* \leq 60$, or
  (iii) $\geq 20\%$, if $0 < L^* \leq 30$, wherein:

$L^*$ is a lightness;

the primer comprises a near infrared reflective inorganic pigment;

the basecoat layer and the clearcoat layer do not contain a near infrared reflective inorganic pigment;

an outer surface of the basecoat layer is directly overcoated by the clearcoat layer;

the clearcoat layer does not contain a dye.

* * * * *

UNITED STATES PATENT AND TRADEMARK OFFICE
CERTIFICATE OF CORRECTION

PATENT NO. : 10,174,213 B2
APPLICATION NO. : 14/344775
DATED : January 8, 2019
INVENTOR(S) : Kruesemann et al.

It is certified that error appears in the above-identified patent and that said Letters Patent is hereby corrected as shown below:

In the Specification

Column 3, Line 1, "The term C* (chrome) used herein means the chroma in", should read -- The term C* (chroma) used herein means the chroma in --

Column 4, Lines 11-19, (Ib) " 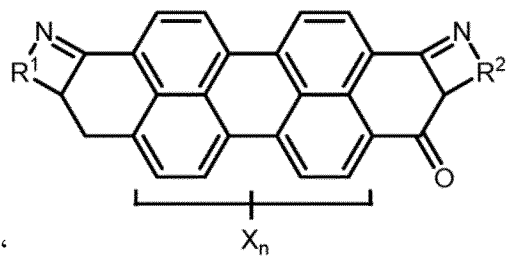 ", should read

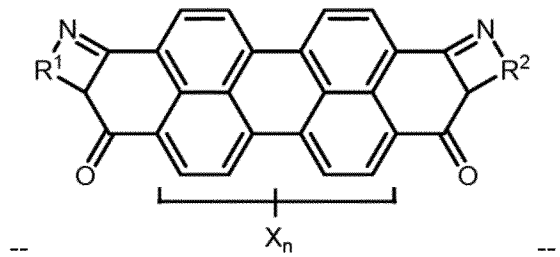

-- --

Column 6, Line 41, "≥(iii) 20%, if O<L *s30, and L * is the lightness", should read
-- (iii) ≥ 20%, if O<L *s30, and L * is the lightness --

In the Claims

Column 16, Line 43, Claim 5 "selected from the group consisting of Color Index (C. I.)", should read
-- selected from the group consisting of Color Index (C.I.) --

Column 17, Line 7, Claim 6 "53, 184, C.I. Pigment Brown 24, 29. 33, 35, C.I. Pigment", should Signed and Sealed this
Fifth Day of May, 2020

Andrei Iancu
*Director of the United States Patent and Trademark Office*

CERTIFICATE OF CORRECTION (continued)
U.S. Pat. No. 10,174,213 B2 read -- 53, 184, C.I. Pigment Brown 24, 29, 33, 35, C.I. Pigment --

Column 17, Line 8, Claim 6 "Blue 28. 36, C.I. Pigment Green 17, 26, 50, C.I. Pigment", should read -- Blue 28, 36, C.I. Pigment Green 17, 26, 50, C.I. Pigment --

Column 17, Line 19, Claim 10 "(b) a dye selected from the group consisting of C. I.", should read -- (b) a dye selected from the group consisting of C.I. --

Column 18, Lines 16-17, Claim 15 "pigment, an indanthrone pigment, an azo pigment, a d sazo condensation pigment, an isoindoline pigment, an", should read -- pigment, an indanthrone pigment, an azo pigment, a disazo condensation pigment, an isoindoline pigment, an --

Column 18, Lines 18-19, Claim 15 "isoindolinone pigment, a quinacridone pigment, a benziniidazolone pigment, a pyrazolochinazolone", should read -- isoindolinone pigment, a quinacridone pigment, a benzimidazolone pigment, a pyrazolochinazolone --

Column 18, Line 50, Claim 18 "clearcoat laver;", should read -- clearcoat layer; --